(12) United States Patent
Ko

(10) Patent No.: US 6,349,928 B1
(45) Date of Patent: Feb. 26, 2002

(54) VIBROISOLATING DEVICE FOR ABSORBING VIBRATION OF RADIATOR

(75) Inventor: Hyun-Bae Ko, Suwon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/569,109

(22) Filed: May 8, 2000

(30) Foreign Application Priority Data

Dec. 7, 1999 (KR) .............................................. 99-55333

(51) Int. Cl.[7] .................................................. F16F 7/00
(52) U.S. Cl. ........................ 267/141.4; 180/68.4; 165/69
(58) Field of Search ............................. 267/141, 136, 267/141.4, 141.5, 140, 153, 220; 165/67, 69; 248/632, 634, 635; 180/68.4

(56) References Cited

U.S. PATENT DOCUMENTS

| | | | |
|---|---|---|---|
| 4,121,682 A | * | 10/1978 | Schaal et al. .............. 180/68.4 |
| 4,579,184 A | * | 4/1986 | Hiramoto .................... 180/68.4 |
| 4,651,839 A | * | 3/1987 | Isobe ....................... 267/141.4 |
| 4,770,234 A | * | 9/1988 | Hiraoka et al. ................ 165/69 |
| 5,558,310 A | * | 9/1996 | Furuie et al. ................ 248/573 |
| 5,911,936 A | * | 6/1999 | Hanazaki et al. ........... 264/250 |

* cited by examiner

Primary Examiner—Robert J. Oberleitner
Assistant Examiner—Marlano Sy
(74) Attorney, Agent, or Firm—Christine, Parker & Hale, LLP

(57) ABSTRACT

A corrosion-free, weight-reduced, separation-free and rubber-adhesive vibroisolating device for absorbing vibration of radiator. The device includes: a rubber vibroisolating body inserted into and supported by a fixation jig formed on a vehicle body; a support portion integrally formed with the rubber vibroisolating body; and a plastic sheet body integrally injection-molded with the rubber vibroisolating body and provided with an inner protruder to be buried in the support portion and a support curvature for supporting an upper support bracket of the radiator.

2 Claims, 4 Drawing Sheets

VIBROISOLATING DEVICE FOR ABSORBING VIBRATION OF RADIATOR

BACKGROUND OF THE INVENTION

1. Field of the Invention

The present invention relates to a vibroisolating device for absorbing vibration of radiator.

2. Description of the Prior Art

A radiator is a kind of tank having a large radiating area, being capable of containing a large quantity of water.

The radiator is mounted in front of an engine for radiating and cooling the cooling water which is circulated to cool an engine and to thereafter be heated. The radiator is cooled by a head wind and driving of a driving fan.

The radiator, being a heavy article, generates vibration when a vehicle is running, which vibration is transmitted to a vehicle body and decreases the comfort and rideability. As a preventive measure for avoiding the vibration from being transmitted to the vehicle body, a vibroisolating device is used to support the radiator on the vehicle body.

FIG. 8 is a schematic drawing for illustrating a structure of a vibroisolating device according to the prior art supporting the radiator in order to cushion the vibration generated from a radiator. The vibroisolating device includes a rubber vibroisolating body 31 inserted and fixed into a fixation jig 30 formed at the vehicle body and a support unit 32 extended from the rubber vibroisolating body 31.

However, there is a problem in that the rubber vibroisolating body 31 has poor durability. In order to prevent the rubber vibroisolating body 31 from being easily broken by the vibration of the continuously vibrating radiator, the support unit 32 is partially inserted by a steel sheet body 33, as illustrated in FIG. 8, to thereby reinforce the strength thereof, such that the vibrating force of the radiator transferred through a support bracket 34 can be absorbed by the steel sheet body 33.

However, there is another problem in that the sheet body 33 can be weakened by corrosion as it is made of steel for reinforcing the strength. In order to prevent corrosion, surface treatment such as plating is performed, which, however, increases the cost. There is still another problem in that adhesion between rubber and steel is not good, and the sheet body 33 should be forcibly and mechanically inserted into the support unit 32 of the rubber vibroisolating body 31.

SUMMARY OF THE INVENTION

In accordance with one object of the present invention, there is provided a vibroisolating device for absorbing vibration of a radiator adapted to be mounted to a fixation jig on a vehicle body, the device comprising:

a rubber vibroisolating body inserted into and supported by a fixation jig formed on a vehicle body;

a support portion integrally formed with the rubber vibroisolating body; and a plastic sheet body integrally injection-molded with the rubber vibroisolating body having an inner protruder buried in the support portion and a support curvature for supporting an upper support bracket of the radiator wherein a bend portion for covering and protecting a tip end of an insertion portion formed at an upper support bracket of the radiator is formed at an upper end of the plastic sheet body.

In accordance with the object of the present invention, there is provided a vibroisolating device for absorbing vibration of radiator, the device comprising:

a rubber vibroisolating body inserted into and supported by a fixation jig formed on a vehicle body;

a support portion integrally formed with the rubber vibroisolating body; and a plastic sheet body integrally injection-molded with the rubber vibroisolating body having an inner protruder buried in the support portion and a support curvature for supporting an upper support bracket of the radiator.

In accordance with another object of the invention, there is provided a vibroisolating device for absorbing vibration of a radiator adapted to be mounted to a fixation jig on a vehicle body, the device comprising:

a rubber vibroisolating body inserted into and supported by a fixation jig formed on a vehicle body;

a support portion integrally formed with the rubber vibroisolating body; and a plastic sheet body integrally injection-molded with the rubber vibroisolating body and provided with an inner protruder buried in the support portion and a support curvature for supporting an upper support bracket of the radiator, wherein an upper part of the plastic sheet body is formed with a plurality of resilient pieces formed by a "U"-shaped cut portion at a predetermined interval.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Operational construction of the present invention will now be described in detail with reference to the accompanying drawings.

Figure 1:
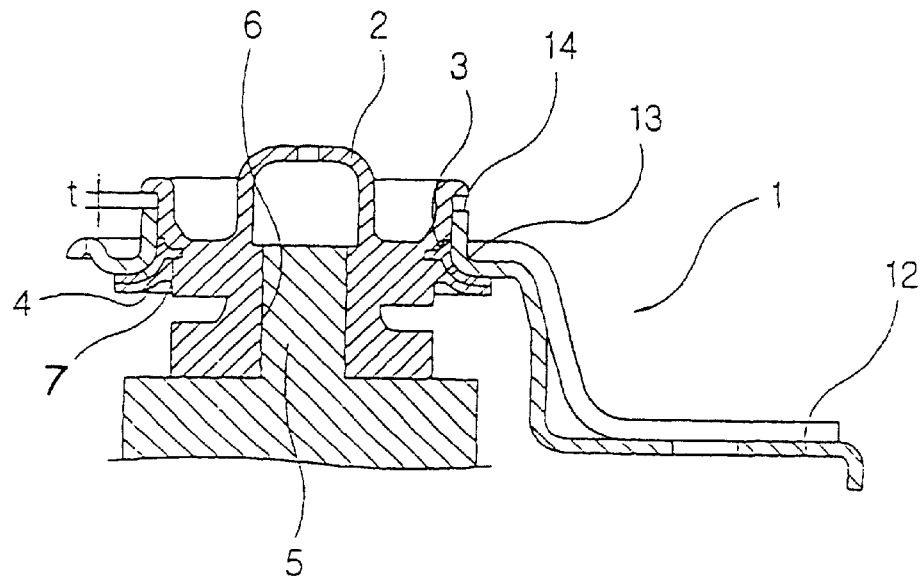
FIG. 1 is a sectional view for illustrating a vibroisolating device for absorbing vibration from a radiator according to the present invention.
Figure 2:
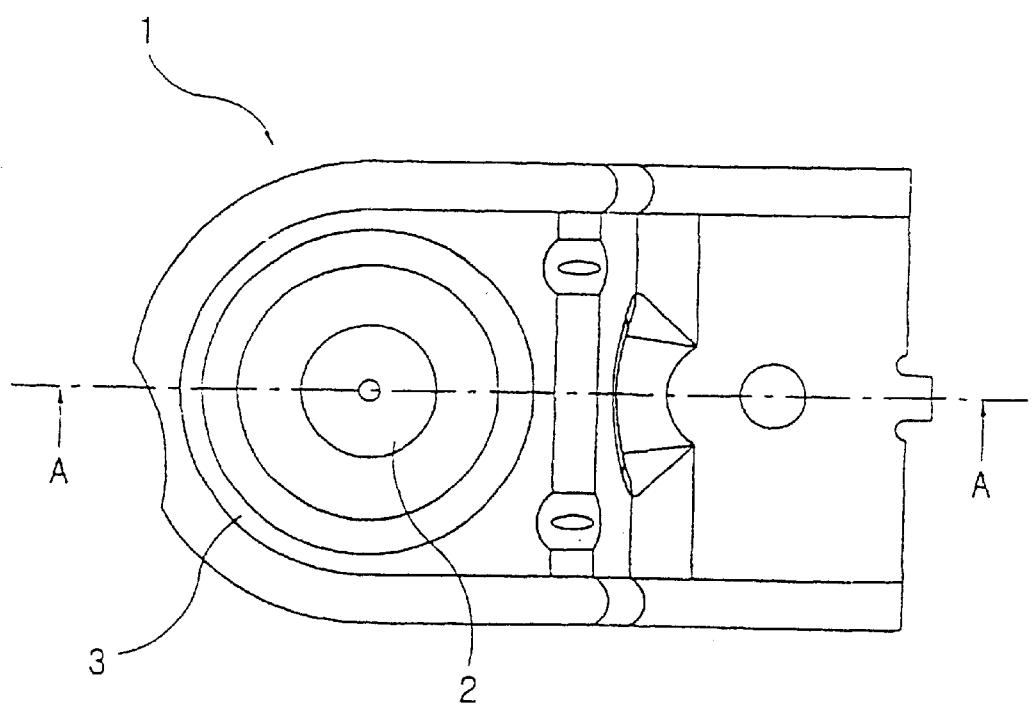
FIG. 2 is a plan view of the vibroisolating device according to the present invention.

A vibroisolating device for absorbing vibration of radiator according to the present invention includes a rubber vibroisolating body 2, a support portion 3 extensively and outwardly formed from the rubber vibroisolating body 2 and a plastic sheet body 4 mounted at the support portion 3, as shown in FIG. 1.

Figure 3:
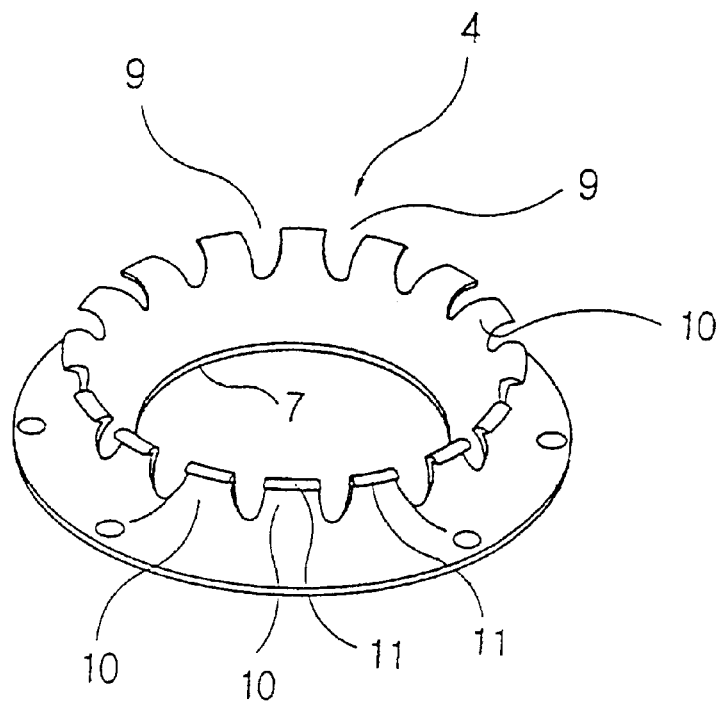
FIG. 3 is a perspective view of a plastic sheet body according to the present invention.

The rubber vibroisolating body 2 is centrally formed with an insertion hole 6 for a fixation jig 5 protruded from a vehicle body to be inserted thereinto for support. The plastic sheet body 4 includes a ring-type inner protruder 7, and an externally exposed surface forming a support curvature portion 8, as best shown in FIG. 3.

Figure 4:
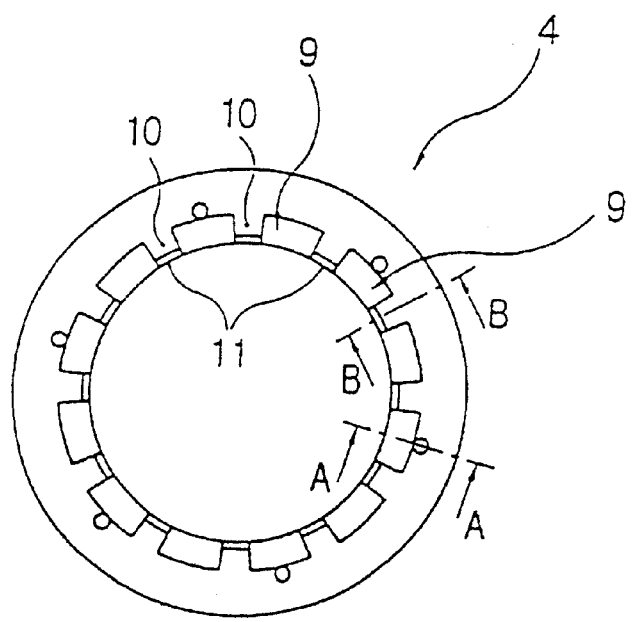
FIG. 4 is a plan view of a plastic sheet body according to the present invention.
Figure 5:
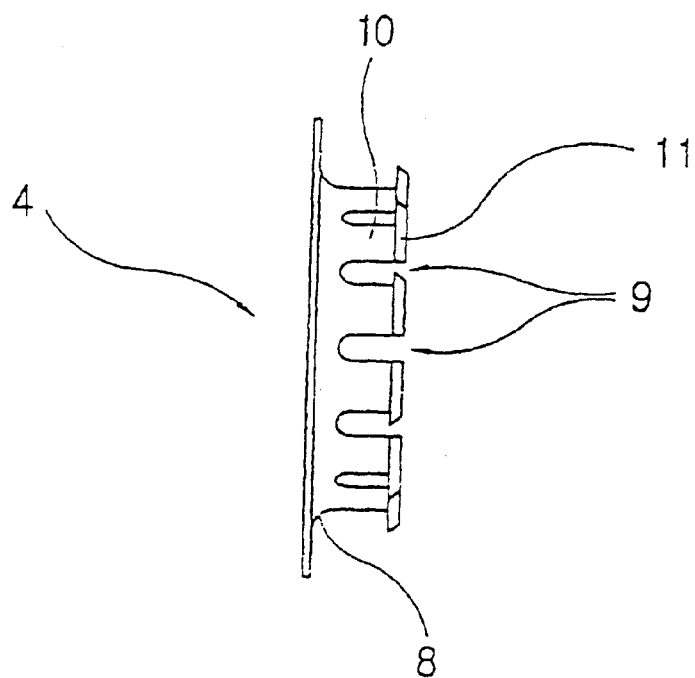
FIG. 5 is a side view of a plastic sheet body according to the present invention.
Figure 6:
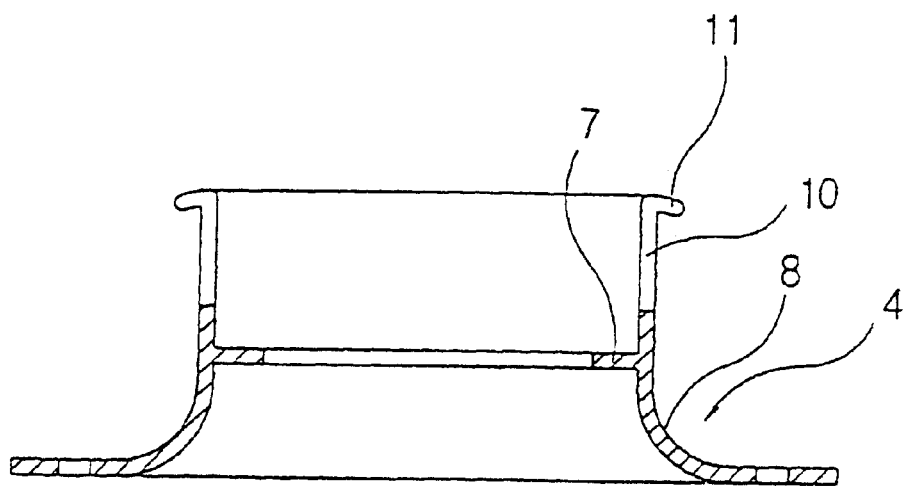
FIG. 6 is a sectional view taken along line A—A of FIG. 4 of a plastic sheet body according to the present invention.
Figure 7:
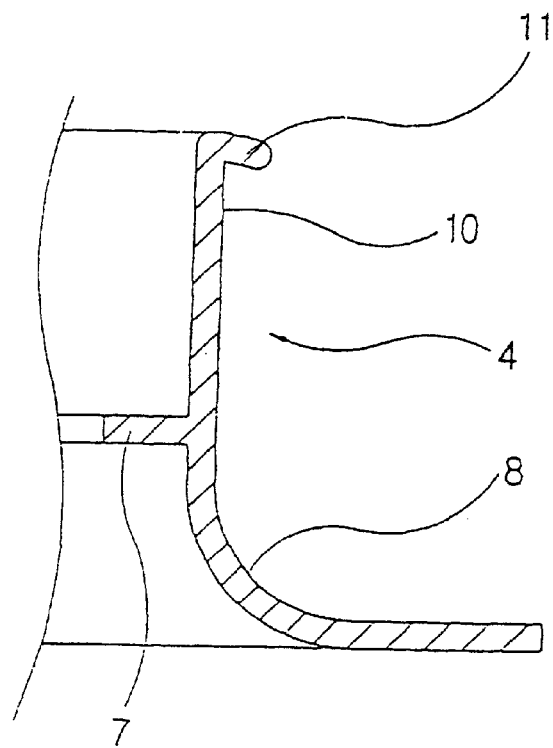
FIG. 7 is a sectional view taken along line B—B of FIG. 4 of a plastic sheet body according to the present invention.
Figure 8:
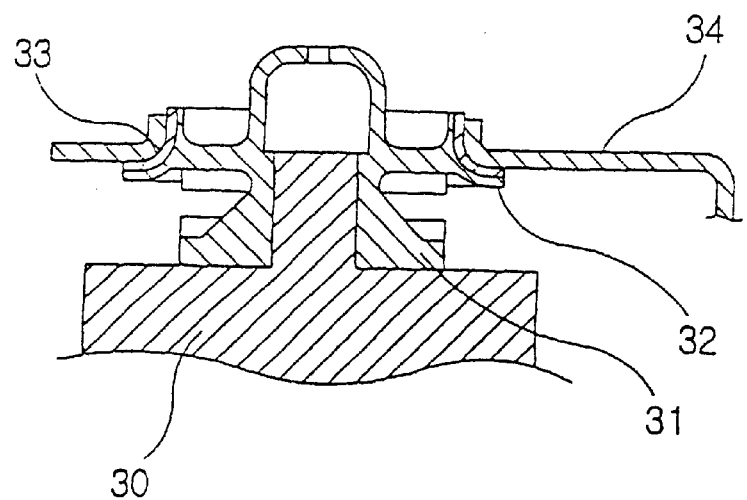
FIG. 8 is a vibroisolating device according to the prior art.

The plastic sheet body 4 is integrally injection-molded with the rubber vibroisolating body 2, where the inner protruder 7 is buried in the support portion 3 to thereby secure the mounting state and enable an easy coupling job. The support curvature portion 8 of the plastic sheet body 4 has an approximate "C"-shaped curvature and is extended in "stand-up" shape, such that resilient pieces 10 are discontinuously arranged by a cut portion 9 cut out in U-shape at upper side thereof at a predetermined space, as shown in FIGS. 3–5.

Furthermore, the resilient pieces 10 are formed thereon with a bent portion 11 which is outwardly bent, and the cut portion 9 is filled in with rubber when injection-molded with the rubber, thereby increasing the coupling force greatly.

As described above, according to the present invention, the rubber vibroisolating body 2 is insertedly mounted to the fixation jig 5 of the vehicle body, which an insertion portion 13 of a radiator upper bracket 12 is supportively inserted by the plastic sheet body 4, thereby completing the assembly job. Vibrations from the radiator is absorbed by the rubber vibroisolating body 2 disposed among parts while being transmitted to the fixation jig 5 via the radiator upper bracket 12, thereby preventing the vibration of the radiator from being delivered to the vehicle body.

The insertion portion 13 at the radiator upper bracket 12 is supportively secured at the curvature portion 8 of the plastic sheet body 4 while a tip end 14 of the insertion portion 13 is protected by the bent portion 11 of the resilient pieces 10 to thereby be prevented from being separated.

Furthermore, between the tip end 14 and the bent portion 11, there is provided an allowable gap (t) of 1~2 mm within which the upper bracket 12 is allowed to move along.

As apparent from the foregoing, there is an advantage in the vibroisolating device for absorbing vibration of radiator according to the present invention thus described in that a plastic sheet body is integrally injection-molded with a rubber vibroisolating body, thereby increasing a better coupling property with the rubber than with steel and thus preventing the sheet body from being separated by vibration.

There is another advantage in that the rubber vibroisolating body can be easily disassembled when the body goes bad in property thereof, thereby enabling reuse of the sheet body. There is still another advantage in that the vibroisolating device is corrosion-free, weight is reduced and manufacturing cost is decreased.

What is claimed is:

1. A vibroisolating device for absorbing vibration of radiator adapted to be mounted to a fixation jig on a vehicle body, the device comprising:

a rubber vibroisolating body inserted into and supported by the fixation jig formed on the vehicle body;

a support portion integrally formed with the rubber vibroisolating body; and a plastic sheet body integrally injection-molded with the rubber vibroisolating body and provided with an inner protruder buried in the support portion and a support curvature for supporting an upper support bracket of the radiator, wherein a bend portion for covering and protecting a tip end of an insertion portion formed at the upper support bracket of the radiator is formed at an upper end of the plastic sheet body.

2. A vibroisolating device for absorbing vibration of radiator adapted to be mounted to a fixation jig on a vehicle body, the device comprising:

a rubber vibroisolating body inserted into and supported by the fixation jig formed on the vehicle body;

a support portion integrally formed with the rubber vibroisolating body; and a plastic sheet body integrally injection-molded with the rubber vibroisolating body and provided with an inner protruder buried in the support portion and a support curvature for supporting an upper support bracket of the radiator, wherein an upper part of the plastic sheet body is formed with a plurality of resilient pieces formed by a "U"-shaped cut portion at a predetermined interval.

* * * * *